US006942596B2

(12) United States Patent
Carlson et al.

(10) Patent No.: US 6,942,596 B2
(45) **Date of Patent: *Sep. 13, 2005**

(54) HYDROMECHANICAL TRANSMISSION ELECTRONIC CONTROL SYSTEM FOR HIGH SPEED VEHICLES

(75) Inventors: Ryan R. Carlson, St. Michael, MN (US); Manfred Maiers, Savage, MN (US); Steven H. Gluck, Cambridge, IA (US)

(73) Assignee: Sauer-Danfoss, Inc., Ames, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/981,330

(22) Filed: Nov. 4, 2004

(65) Prior Publication Data

US 2005/0085979 A1 Apr. 21, 2005

Related U.S. Application Data

(63) Continuation of application No. 10/435,692, filed on May 12, 2003, now Pat. No. 6,852,064.

(60) Provisional application No. 60/395,653, filed on Jul. 18, 2002.

(51) Int. Cl.[7] ................................................ F16H 61/40

(52) U.S. Cl. ............................. 477/52; 60/446; 60/492

(58) Field of Search .......................... 60/445, 446, 449, 60/490, 492; 477/52

(56) References Cited

U.S. PATENT DOCUMENTS

| | | | |
|---|---|---|---|
| 4,395,199 | A | 7/1983 | Izumi et al. |
| 5,390,759 | A | 2/1995 | Gollner |
| 6,067,795 | A | 5/2000 | Lino et al. |
| 6,250,077 | B1 | 6/2001 | Lino et al. |
| 6,280,152 | B1 | 8/2001 | Sugiura et al. |
| 6,343,470 | B1 | 2/2002 | Nanri et al. |

*Primary Examiner*—Ha Ho

(57) ABSTRACT

An electronic transmission control system that can achieve a transmission ratio based on the operator inputs and the current vehicle operating conditions. The transmission constantly connects the engine to the load, and the transmission ratio is only varied by a change in command from the present invention. The transmission's mechanical function is solely to vary the ratio between its input and output. In using the present invention, an operator must select an operating mode, either automatic or manual, using a two-position switch. While in the automatic mode, the present invention determines the vehicle speed by considering the position of the throttle and the operator's use of brakes. In the manual mode, the present invention further considers the operator's selection of a gear condition.

14 Claims, 5 Drawing Sheets

HYDROMECHANICAL TRANSMISSION ELECTRONIC CONTROL SYSTEM FOR HIGH SPEED VEHICLES

CROSS REFERENCE TO RELATED APPLICATION

This application is a continuation of application Ser. No. 10/435,892 filed May 12, 2003 now U.S. Pat. No. 6,852,064.

This application is based upon Applicants' Provisional Application Ser. No. 60/396,653 filed Jul. 18, 2002.

BACKGROUND OF THE INVENTION

This invention relates generally to hydromechanical transmissions and, more particularly, to electronic control systems for hydromechanical transmissions.

Hydromechanical transmissions (HMTs) have been developed for vehicles to replace conventional automatic belt drive transmissions. In particular, HMTs have been developed for use with all-terrain vehicles (ATVs). The advantages of HMTs include increased power capacity, greater durability, and protection from environmental degradation. Even though the mechanical implementation and functionality of HMTs is very different from conventional belt-driven units, consumers prefer that vehicles drive and feel like conventional belt-driven units while still offering the advantages of HMTs.

Conventional belt drive transmissions use a centrifugal clutch or slipping belt to smoothly accelerate the vehicle from rest. Smooth startup conditions, however, are difficult to achieve with HMTs.

Another disadvantage of HMTs is the inability to react quickly to a dynamic operating environment. ATVs operate at a wide range of speeds, from creeping speeds to as fast as 90 km/hr. In addition, ATVs are used for a variety of functions, from racing to pulling heavy loads. Further, ATVs often are used on a wide variety of ground surfaces. HMTs often have difficulty reacting quickly to these factors, producing a harsher ride than conventional belt-driven units.

Yet another disadvantage of HMTs is the inability to react to operator-controlled braking systems. HMTs typically provide very little dynamic braking capability and therefore must be protected from overspeed during vehicle deceleration.

It is therefore a principal object of this invention to provide an electronic control system for HMTs that allows for smooth startup conditions.

A further object of this invention is to provide an electronic control system for HMTs that allows for quicker reaction to a dynamic operating environment.

Still a further object of this invention is to provide an electronic control system for HMTs that allows for an improved reaction to operator-controlled braking systems.

These and other objects will be apparent to those skilled in the art.

BRIEF SUMMARY OF THE INVENTION

The present invention comprises an electronic transmission control system designed to achieve a transmission ratio based on the operator inputs and the current vehicle operating conditions. The invention is intended for HMTs; however, the present invention also may be used with pure hydrostatic transmissions or any other transmission system that provides an infinitely variable transmission ratio from zero to maximum output speeds.

Because of the present invention's ability to provide a smooth startup condition, the present invention is best suited for use with dynamic operating conditions. In particular, the present invention reacts quickly to rapidly changing load and operation characteristics. Further, the present invention is best suited for use with high speed vehicles. The invention is intended for use with ATVs; however, the present invention also may be used with other types of vehicles, both large and small.

The present invention is optimized for ratio-controlled HMTs. In such an arrangement, the transmission constantly connects the engine to the load, and the transmission ratio is only varied by a change in command from the electronic control system. The transmission's mechanical function is solely to vary the ratio between its input and output. This is different from conventional transmissions, which use a torque or load-sensitive device, such as a slipping belt, centrifugal clutch, pressure-modulated clutch, or torque converter, to achieve a smooth startup condition.

In using the present invention, an operator must select an operating mode, either automatic or manual, using a two-position switch. While in the automatic mode, the present invention determines the vehicle speed by considering the position of the throttle and the operator's use of brakes. In the manual mode, the present invention further considers the operator's selection of a gear condition. Both modes of operation require the operator to select a range gearbox condition, such as forward low, forward high, reverse, neutral, or park.

DESCRIPTION OF THE INVENTION

Figure 1:
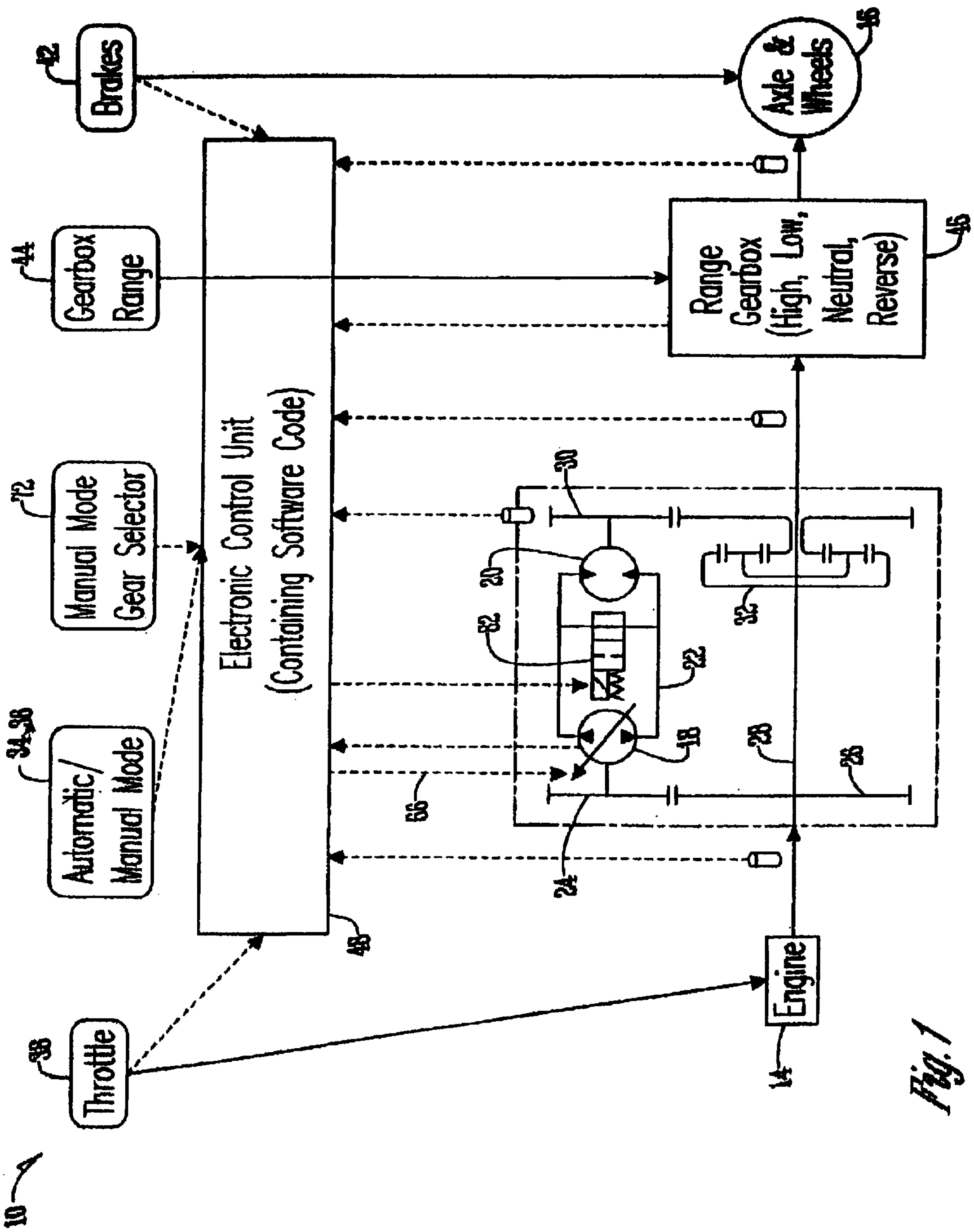
FIG. 1 is an overall system diagram of the invention.

With respect to FIG. 1, an electronic transmission control system 10 is disclosed that achieves a transmission ratio based on the operator inputs and the current vehicle operating conditions. The electronic transmission control system 10 works to control HMT 12, which connects a vehicle engine 14 to the vehicle wheels 16.

HMT 12 includes a pump 18 connected to a motor 20 by closed loop 22. Pump 18 is connected to a driven gear 24 rotated by driving gear 26, which is connected to a crank shaft 28. Motor 20 is connected to gear 30, which is connected to planetary gear set 32 and works to drive wheels 16.

A glossary of terms for use in describing the control system 10 appears below:

| Term | Description |
|---|---|
| Automatic Mode | Electronic control system automatically sets transmission ratio. |

-continued

| Term | Description |
|---|---|
| Brake Command | Sensed position of operator's brake commanded (typically a lever or pedal). |
| Commanded Engine Speed | Throttle position that has been converted to RPMs. This is an approximate curve based on no engine load. |
| Current Engine Speed | Actual measured engine speed. |
| Engine Load Monitor (ELM) | Control system block that reduces swashplate command during load conditions. |
| Gear Command | Operator selected gear in manual mode. |
| Manual Mode | Electronic control system sets transmission ratio based on the Gear Command. Simulates a transmission with a series of discrete gear ratios. |
| Set Point Calculation Block (SPCB) | Control system block that calculates the desired swashplate setpoint. |
| Swashplate Setpoint | Calculated swashplate desired position, determined by the SPCB. |
| Throttle Position | Sensed position of operator's throttle commanded (typically a lever or pedal). |
| Vehicle Situation | Either accelerating or decelerating. |
| Vehicle Speed | Measured vehicle speed. |

The control system 10 has two modes of operation, automatic 34 and manual 36. The operator selects the mode of operation using a two-position switch (not shown).

Figure 3:
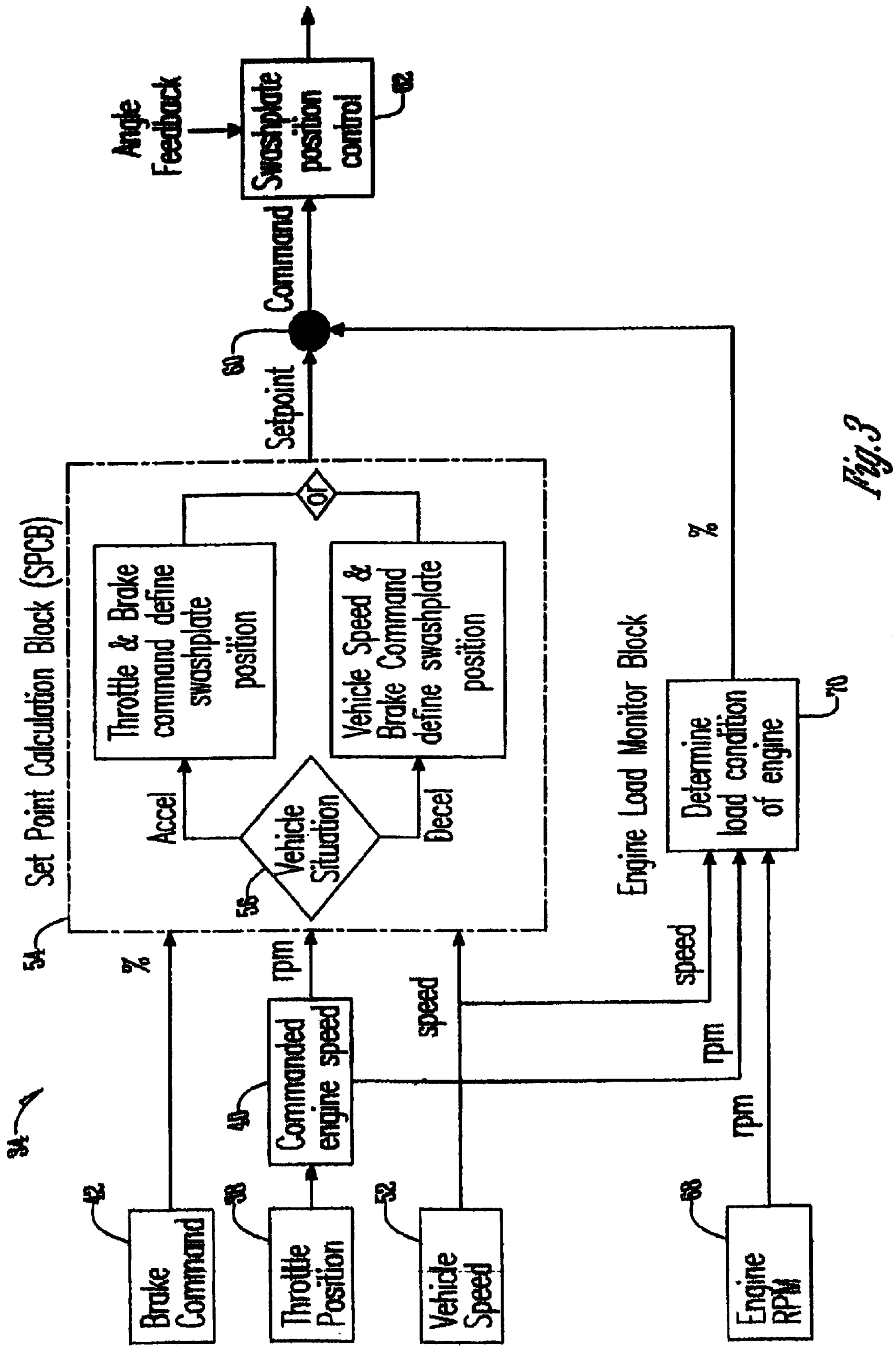
FIG. 3 is a diagram illustrating the automatic mode.

With respect to FIG. 3, the automatic mode 34 of operation is shown. In the automatic mode 34, the operator adjusts the throttle position 38 to achieve a desired commanded engine speed 40. In addition, the operator may apply the vehicle brakes 42 either to slow down or completely stop the vehicle. Further, the operator adjusts the range selection control 44 to select the range gearbox 46 condition, including forward high, forward low, reverse, neutral, and park (FIG. 1). The range gearbox 46 also may include reverse low and reverse high conditions. A reverse creep condition may be achieved by stroking the swashplate further into the stroke.

Figure 2:
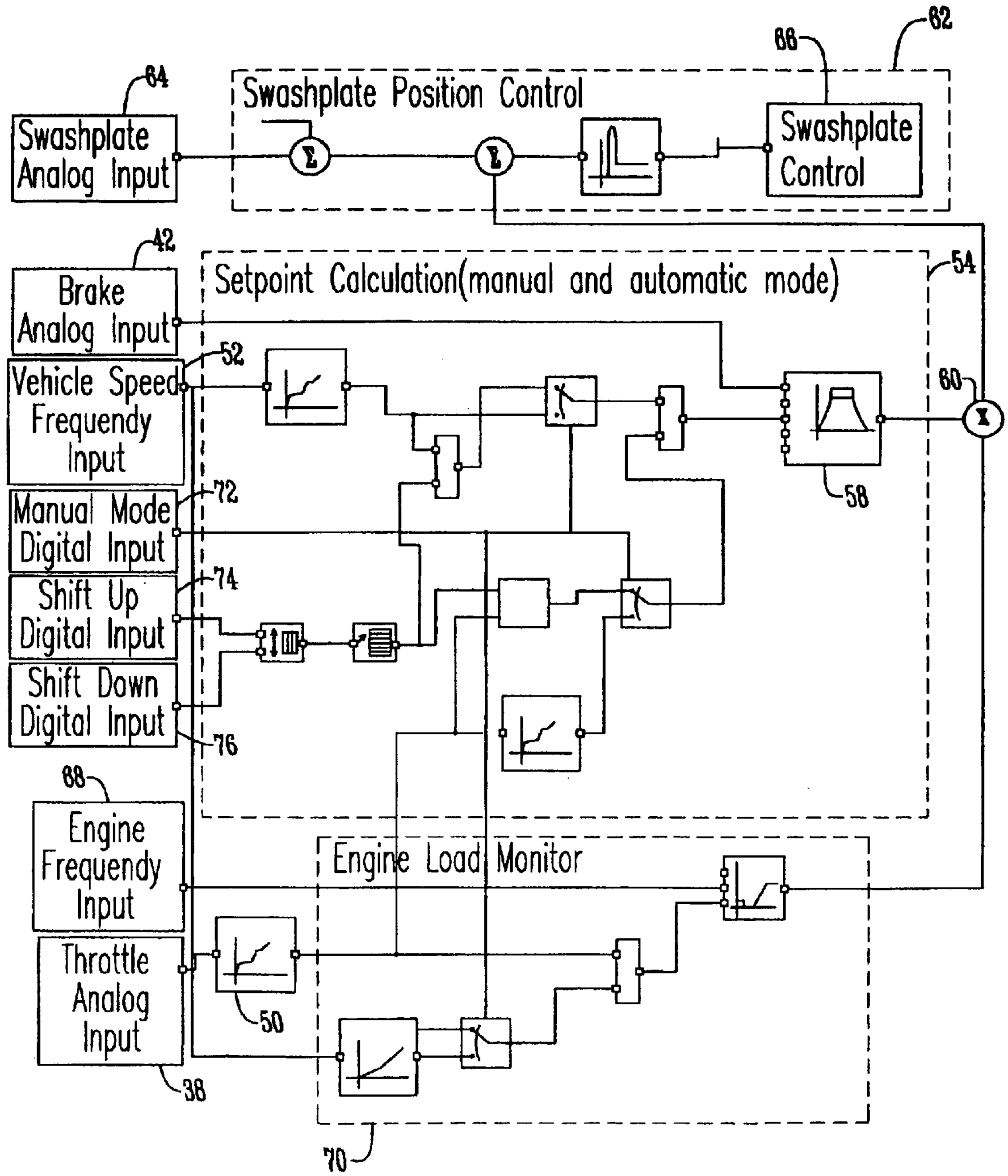
FIG. 2 is a more detailed diagram showing the swashplate position control, setpoint calculation, and engine load monitor.

The electronic control unit 48 (FIG. 1) takes the operator inputs and uses them to achieve a transmission ratio. Specifically, the throttle position 38, which is converted into a digital or electrical signal by a sensor (not shown), is translated into the commanded engine speed 40 by comparing the throttle position to a predicted no-load engine RPM. The electronic control unit 48 determines the throttle position 38 and then estimates what the engine speed would be in an unloaded condition. The relationship between the throttle position 38 and the predicted no-load engine RPM is typically non-linear and is defined in the Position vs. RPM Profile software module 50 (FIG. 2). The electronic control unit 48 also considers the vehicle speed 52 in addition to the brake command 42 discussed above.

The electronic control unit 48 includes a setpoint calculation block (SPCB) 54, which takes the commanded engine speed 40, brake command 42, and vehicle speed 52 as inputs. The SPCB 54 determines the vehicle situation 56, which is either accelerating or decelerating. The SPCB 54 then uses an algorithm 58 (FIG. 2) to calculate the swashplate setpoint 60 based on the vehicle situation 56. In either an accelerating or decelerating vehicle situation 56, the swashplate setpoint 60 can be modified through a time-based dynamic ramp within the SPCB 54.

If the SPCB 54 determines the vehicle situation 56 to be accelerating, then the electronic control unit 48 also uses the swashplate position control 62 in determining the swashplate setpoint 60. The swashplate position control 62 uses the swashplate setpoint 60 and the actual swashplate position 64 to generate a signal for the swashplate control 66, which provides closed loop swashplate position feedback. The swashplate position control 62 takes the engine speed 68 and brake command 42 as inputs and compares them against a Commanded Engine Speed vs. Swashplate Setpoint Profile. When the brakes are applied, the brake command 42 overrides the requested setpoint 60 to slow the vehicle.

If the SPCB 54 determines the vehicle situation 56 to be decelerating, then the swashplate setpoint 60 is based on the actual vehicle speed 52. In this situation, a Vehicle Speed vs. Swashpoint Setpoint Profile is used. When the brakes are applied, the brake command 42 overrides the requested setpoint 60 to slow the vehicle.

The electronic control unit 48 also includes an engine load monitor (ELM) 70. ELM 70 takes the commanded engine speed 40, current engine speed 68, and the vehicle speed 52 as inputs to determine the engine load condition. The output of the ELM 70 reduces the raw setpoint 60 in the case of excessive load. ELM 60 also produces a downshift behavior during re-acceleration. Because of ELM 60, the engine speed 68 increases with the vehicle speed 52. This creates a desirable feel to the vehicle, whereby the operator perceives that the vehicle speed 52 is increasing as a function of the increasing engine speed 68.

Figure 4:
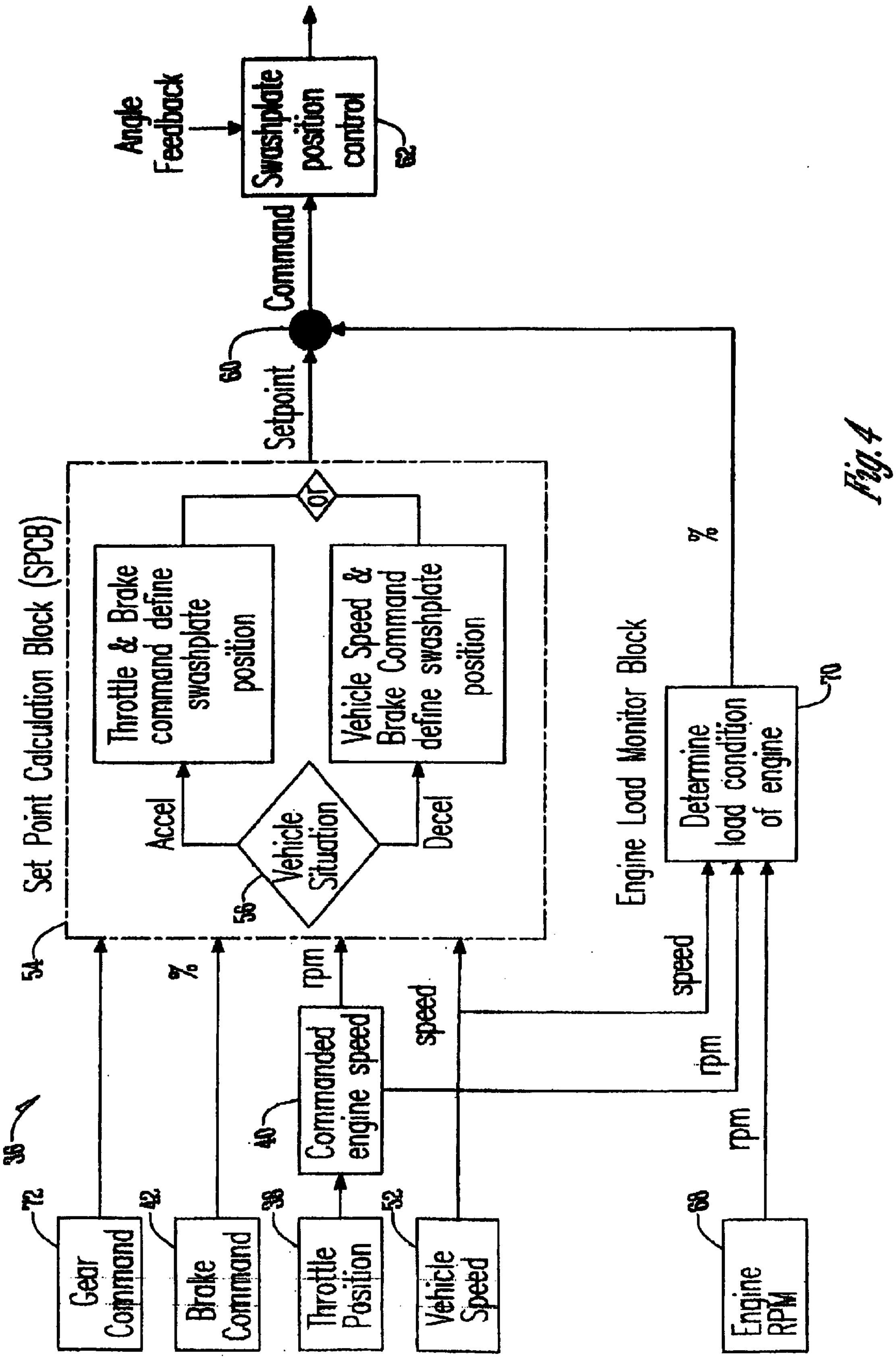
FIG. 4 is a diagram illustrating the manual mode.

With respect to FIG. 4, the manual mode 36 of operation is shown. Similar to the automatic mode, the operator adjusts the throttle position 38 to achieve a desired commanded engine speed 40. In addition, the operator may apply the vehicle brakes 42 either to slow down or completely stop the vehicle. Further, the operator adjusts the range selection control 44 to select the range gearbox 46 condition, including forward high, forward low, reverse, neutral, and park (FIG. 1). In the manual mode, the operator also adjusts a gear selector 72 to limit or set the gear ratio. There are typically between four and six simulated gear ratios from which the operator may choose by selecting the shift up 74 or shift down 76 condition (FIG. 2).

As with the automatic mode, the SPCB 54 takes the commanded engine speed 40, brake command 42, and vehicle speed 52 as inputs. In the manual mode, the SPCB 54 also takes the gear command 72 as an input. The SPCB 54 determines the vehicle situation 56, which is either accelerating or decelerating. The SPCB 54 then uses an algorithm 58 (FIG. 2) to calculate the swashplate setpoint 60 based on the vehicle situation 56. In either an accelerating or decelerating vehicle situation 56, the swashplate setpoint 60 can be modified through a time-based dynamic ramp within the SPCB 54.

If the SPCB 54 determines the vehicle situation 56 to be accelerating, then the electronic control unit 48 uses the engine speed 68, brake command 42, and gear command 72 to calculate the swashplate setpoint 60. In this case, the Commanded Engine Speed vs. Swashplate Setpoint Profile is used. When the brakes are applied, the brake command 42 overrides the requested setpoint 60, thereby limiting the maximum transmission ratio and vehicle speed.

If the SPCB 54 determines the vehicle situation 56 to be decelerating, then the electronic control unit 48 uses the actual vehicle speed 52 and the gear command 72 to calculate the swashplate setpoint 60. In this case, the Vehicle Speed vs. Swashplate Setpoint Profile is used. When the brakes are applied, the brake command 42 overrides the requested setpoint 60 to slow the vehicle. The gear command 72 limits the swashplate setpoint 60.

The electronic control unit 48 also uses the ELM 70 to determine the engine load condition. ELM 70 takes the commanded engine speed 40, current engine speed 68, and the vehicle speed 52 as inputs. The output of the ELM 70 reduces the raw setpoint 60 in the case of excessive load and produces a downshift behavior during re-acceleration. The swashplate position control 62 uses the output of the ELM 70 as well as the actual swashplate position 64 to generate a signal for the swashplate control 66 (FIG. 2), which provides closed-loop swashplate position feedback.

In operation, the electronic transmission control system 10 quickly reacts to a wide variety of vehicle dynamics and operating conditions. The electronic transmission control system 10 can operate from creeping speeds up to a maximum vehicle speed 52 of 90 km/hr. without changing transmission modes.

Further, the elimination of a centrifugal clutch allows the electronic transmission control system 10 to achieve zero vehicle speed. HMT 12 can be designed to achieve zero output speed by the selection and arrangement of planetary ratios and hydrostatic component sizing. The swashplate position control 62 then uses a zero speed offset to command the HMT 12 to zero speed. Holding zero speed also can be accomplished by measuring the speed and direction of the control leg 30 of the planetary gear set 32 (FIG. 1). This offers an advantage over a centrifugal clutch because the electronic transmission control system 10 can hold the vehicle at zero speed independent of the load, even on steep slopes.

Figure 5:
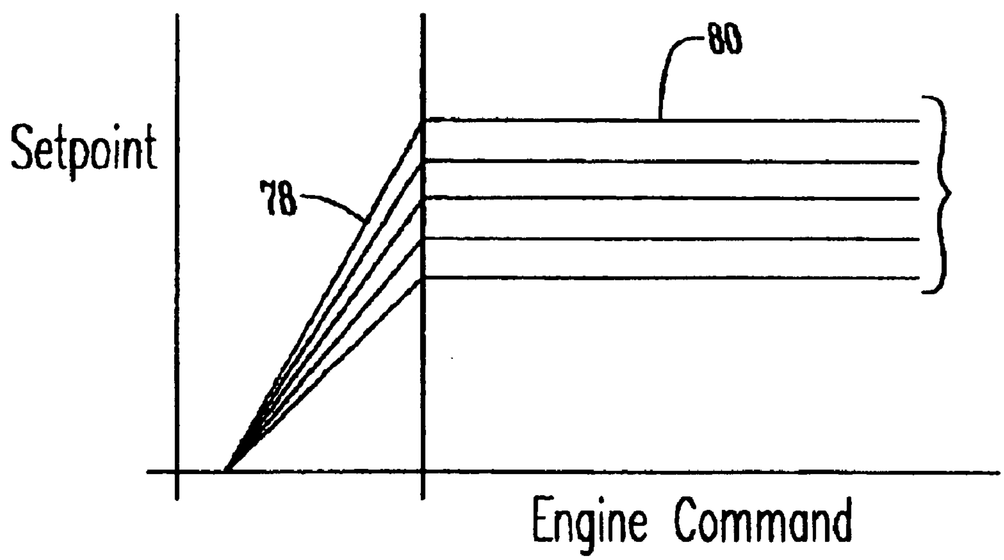
FIG. 5 is a graph for manual mode startup plotting setpoint versus engine command.

Because the electronic transmission control system 10 does not use a centrifugal clutch, the system 10 does not have inherent mechanical or hydraulic characteristics to provide a smooth startup condition. The smooth startup condition is achieved through use of the time-based dynamic ramp within the SPCB 54. In the automatic mode 34, the electronic transmission control system 10 can achieve a smooth startup condition using a dynamic ramp based on the vehicle speed 52. In the manual mode 36, the control system 10 can achieve a smooth startup condition by using a short automotive curve 78 combined with a fixed ratio 80, as shown in FIG. 5.

In another embodiment, the electronic transmission control system 10 can achieve a smooth startup condition by using a hydro loop variable bypass valve 82 (FIG. 1). A hydro loop variable bypass valve 82 connects the two sides of the hydrostatic power loop 22 together only when commanded. This interconnection reduces the torque transmitting capacity of the hydrostatic units, and therefore can help modulate the vehicle startup condition. The bypass valve 82 may be infinitely variable or may operate in an on/off arrangement. The bypass valve 82 also may be used to quickly reduce engine load when the brakes 42 are applied. This provides smoother deceleration and reduces engine lug-down and stalling during hard braking. Alternatively, the control system 10 may also be adapted to use a brake sensor (not shown) to help prevent stalling during hard braking. Such a sensor may be used to synchronize the HMT 12 with the brakes 42 to avoid fighting between them.

The electronic transmission control system 10 also provides very little engine dynamic braking. Some engines 14, particularly low power recreational and utility vehicles, have very little capacity to absorb power during vehicle deceleration. If the transmission ratio is decreased too quickly, excessive torque might be applied to the engine 14 resulting in overspeed and damage. Because the SPCB 54 determines the vehicle situation 356, the control system 10 recognizes when the vehicle is decelerating. The ELM 70 inputs the actual vehicle speed 52 and uses the Vehicle Speed vs. Setpoint Profile to continually adjust the transmission ratio to decelerate the vehicle without over-speeding the engine.

From the foregoing, it is seen that this invention will accomplish at least all of its stated objectives.

What is claimed is:

1. A control for a hydrostatic transmission having a swashplate and connecting an engine to a pair of wheels on a vehicle, wherein said engine has an engine speed, said wheels rotate to cause a rotation, and said vehicle is operating at varying speeds, the control comprising:

a throttle having varying positions that vary the rotation of the wheels;

a brake having varying positions that varies the rotation of the wheels;

means for sensing a position of the throttle and converting the throttle position to a commanded engine speed;

means for sensing a position of the brake;

means for sensing the speed of the vehicle;

an electronic control unit that receives the commanded engine speed, brake position, and vehicle speed and sets a swashplate position, wherein the swashplate position is determined by the commanded engine speed and brake position when the vehicle is accelerating and by the vehicle speed and brake position when the vehicle is decelerating; and means for sensing the position of the swashplate and adjusting the position of the swashplate as determined by the electronic control unit.

2. The control of claim 1 further comprising means for sensing the speed of the engine.

3. The control of claim 2, wherein the electronic control unit reduces the set position of the swashplate.

4. The control of claim 1 further comprising a gear selector to select a gear ratio.

5. The control of claim 4, wherein the electronic control unit further receives the gear ratio and sets the position of the swashplate, wherein the swashplate position is determined by the commanded engine speed and brake position when the vehicle is accelerating and by the vehicle speed and brake position when the vehicle is decelerating.

6. A hydromechanical transmission for connecting an engine to a pair of wheels on a vehicle, the hydromechanical transmission comprising:

a hydraulic pump and a hydraulic motor connected with each other through a closed hydraulic loop on a driving shaft, the pump including a driven gear for being rotated by a driving gear mounted on a crank shaft of the engine;

said engine having an engine speed;

said wheels rotate to cause a rotation;

said vehicle is operating at varying speeds;

a swashplate having varying swashplate positions in connection with the pump;

a throttle having varying positions that vary the rotation of the wheels;

a brake having varying positions that varies the rotation of the wheels;

means for sensing the position of the throttle and converting the throttle position to a commanded engine speed;

means for sensing the position of the brake;

means for sensing the speed of the vehicle;

an electronic control unit that receives the commanded engine speed, brake position, and vehicle speed and sets the swashplate position, wherein the swashplate position is determined by the commanded engine speed and brake position when the vehicle is accelerating and by the vehicle speed and brake position when the vehicle is decelerating; and means for sensing the swashplate position and adjusting the swashplate position as determined by the electronic control unit.

7. The hydromechanical transmission of claim 6 further comprising means for sensing the speed of the engine.

8. The hydromechanical transmission of claim 7, wherein the electronic control unit reduces the set position of the swashplate.

9. The hydromechanical transmission of claim 6 further comprising a gear selector to select a gear ratio.

10. The hydromechanical transmission of claim 9, wherein the electronic control unit further receives the gear ratio and sets the position of the swashplate, wherein the swashplate position is determined by the commanded engine speed and brake position when the vehicle is accelerating and by the vehicle speed and brake position when the vehicle is decelerating.

11. A method of controlling a hydromechanical transmission having a swashplate that has varying swashplate positions, an operator-controlled throttle that has varying throttle positions, and an operator-controlled brake that has varying position, on a vehicle that has a varying vehicle speed, the method comprising:

sensing the position of the throttle;

converting the throttle position to a commanded engine speed by comparing the throttle position against a predicted no-load engine RPM;

sensing the speed of the vehicle;

sensing the position of the brake;

sensing the position of the swashplate;

taking the commanded engine speed, vehicle speed, and brake position to determine a vehicle situation; and setting the swashplate position for the vehicle situation, wherein the commanded engine speed and brake position determine the swashplate position when the vehicle situation is accelerating and the vehicle speed and brake position determine the swashplate position when the vehicle situation is decelerating.

12. The method of claim 11 wherein the vehicle has an engine speed and the method further comprising the step of sensing the speed of the engine.

13. The method of claim 12 further comprising reducing the set position of the swashplate.

14. The method of claim 11, wherein an operator-controlled gear ratio also is used to determine the vehicle situation.

* * * * *